United States Patent [19]
Watson et al.

[11] 3,710,237
[45] Jan. 9, 1973

[54] PROBE FOR A CONDUCTIVITY TESTING DEVICE

[75] Inventors: William R. Watson, Oak Lawn; James J. Moran, Matteson, both of Ill.

[73] Assignee: Nalco Chemical Company, Chicago, Ill.

[22] Filed: Sept. 8, 1970

[21] Appl. No.: 70,323

[52] U.S. Cl. ................................. 324/30 R, 324/65
[51] Int. Cl. .............................................. G01n 27/42
[58] Field of Search ....... 324/29, 29.5, 30 R, 30 B, 65 SM, 324/65 M, 65 P

[56] References Cited

UNITED STATES PATENTS

| | | | |
|---|---|---|---|
| 3,139,085 | 6/1964 | Custance | 324/65 P |
| 2,922,105 | 1/1960 | Estelle | 324/30 R |
| 3,498,131 | 3/1970 | Rickey | 73/304 |

*Primary Examiner*—Michael J. Lynch
*Attorney*—Kinzer, Dorn & Zickert, John G. Premo, Charles W. Connors and Edward A. Ptacek

[57] ABSTRACT

A probe having at least one conductivity cell defined by a pair of electrodes formed as printed circuitry on a substrate of insulting material such as a printed circuit board. The probe is adapted to be immersed in the solution to be measured, and may or may not include a thermistor on the substrate to compensate for variation in solution temperature. The exposed area of the electrodes and the distance therebetween can be accurately and precisely controlled to provide consistent cell constants in probe manufacture.

2 Claims, 6 Drawing Figures

PATENTED JAN 9 1973 3,710,237

INVENTORS
WILLIAM R. WATSON
JAMES J. MORAN
BY
Kinzer, Dorn & Zickert
ATTORNEYS

PROBE FOR A CONDUCTIVITY TESTING DEVICE

This invention relates in general to a probe for use with a conductivity tester to measure the electrolytic conductivity of a solution, and more particularly to a probe utilized in measuring conductivity of industrial solutions or waters.

The electrical conductivity of an industrial solution or water, such as boiler water for making steam, oils, electrolytes, acids, and others, is important in the control of processes utilizing such solutions or waters. The measurement unit, mho/cm and micromho/cm, or commonly referred to as mho or micromho indicates conductivity. For example, the specific conductance of high quality condensed steam and distilled or demineralized water at room temperature will be 1 micromho/cm or less. Conductivity measuring consists of measuring the resistance of a solution. A typical conductivity measuring device is disclosed in our copending application Ser. No. 834,981, filed June 29, 1969 now U.S. Pat. No. 3,582,768. The measurement process includes immersing a probe in the solution to be tested and taking a direct reading from a meter.

The present invention concerns a probe for use with a conductivity tester. Heretofore, probes for use with conductivity testers, such as the probe disclosed in the aforesaid application for patent, have not been easily cleanable, and have been restricted as to the number of conductivity cells.

One type of probe heretofore known includes a pair of cylindrical electrodes of a suitably electrically conducting material arranged within a hollow cylindrical opening at one end through which the solution to be measured must enter and contact the electrodes. Cleaning of this probe has proved difficult, and since the cell constant depends not only on the exposed area of the electrodes, but also the distance between the electrodes, consistency of cell constant has been difficult to obtain. Another type of probe, like that disclosed in our copending application for patent, includes spaced rings arranged within a hollow cylinder. Since the rings must be machined to be accurate, the probe becomes quite expensive, and difficulty is encountered in cleaning the probe in that a special brush must be provided.

The probe of the present invention overcomes the difficulties heretofore encountered in providing a unit that may be easily cleanable, consistently manufactured with precision, and made inexpensively compared to heretofore known probes. The probe of the invention includes a substrate of insulative material, such as printed circuit board, onto which the electrodes are applied as printed circuitry with the precision and economy capabilities of modern printed circuitry techniques. Any number of conductivity cells may be provided on the printed circuit board to facilitate the versatility of the probe. Moreover, cleaning of the probe is very simple in that it only requires wiping off with a cloth or the like.

It is therefore an object of the present invention to provide a new and improved probe for use in measuring the electrolytic conductivity of industrial solutions and waters.

Another object of the present invention is in the provision of a probe for measuring electrolytic conductivity of industrial solutions of waters, wherein the probe is made with conventional printed circuit knowledge whereby a conductivity cell on a probe can be made with close tolerances to provide consistency of the cell constant between probes.

A further object of this invention is to provide a probe for measuring the electrolytic conductivity of solutions and waters which can be inexpensively manufactured and which can be easily cleaned, and which have a relatively long life.

A still further object of this invention resides in the provision of a probe for use with a conductivity tester, wherein the probe may have a plurality of conductivity cells to facilitate its versatility in the measuring of electrolytic conductivity of different types of industrial solutions and waters.

A still further object of the present invention is in the provision of a probe for use with a conductivity testing device to measure electrolytic conductivity of industrial solutions and waters, wherein the cell constant of one or more conductivity cells provided on the probe may easily be varied during the initial construction of the probe.

Another object of this invention is to provide a probe for a conductivity tester that may be easily maintained and especially maintenance-free, and which will not easily break if dropped.

Other objects, features and advantages of the invention will be apparent from the following detailed disclosure, taken in conjunction with the accompanying sheet of drawing, wherein like reference numerals refer to like parts, in which.

Figure 1:
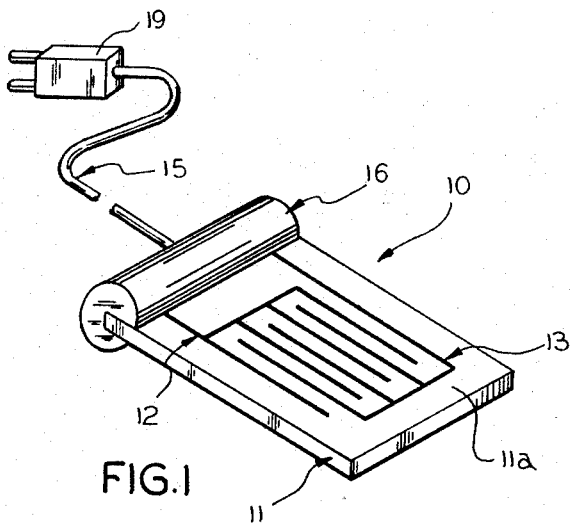
FIG. 1 is a perspective view of a conductivity probe according to the invention.
Figure 2:
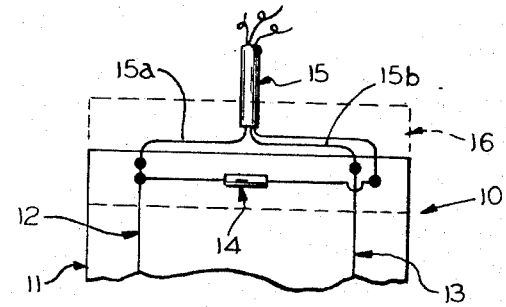
FIG. 2 is an enlarged fragmentary and somewhat diagrammatic view of the probe of FIG. 1 with some parts omitted for purposes of clarity to show underlying construction.
Figure 3:
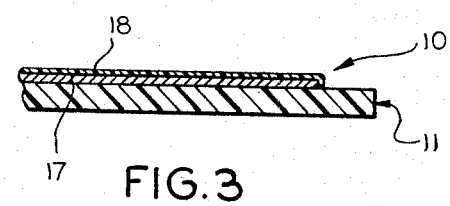
FIG. 3 is an enlarged fragmentary vertical sectional view taken through the probe of FIG. 1 along one of the electrodes to illustrate the electrode structure.

Referring now to the drawings and particularly to FIG. 1, the probe illustrated in FIGS. 1 to 3, generally designated by the numeral 10, includes a substrate 11 of insulative material, upon which in the form of printed circuitry a pair of electrodes 12 and 13 are formed on the surface 11a, a thermistor 14 carried by the substrate 11, an electric cord 15 and encapsulation material 16.

The substrate 11 may be usual printed circuit board which is essentially epoxy-filled Fiberglass. The electrodes 12 and 13 are etched on the substrate pursuant to the usual printed circuitry techniques, and include as shown in FIG. 3 a laminate 17 of copper coated with a conductive layer 17 of inert material which is anti-corrosive. For example, the coating 18 may be of a noble metal such as platinum, nickel, gold or rhodium. The electrodes 12 and 13 each include a plurality of interspaced fingers.

The electrodes 12 and 13 together constitute a conductivity cell, the cell constant of which is dependent upon the distance between the electrodes and the exposed area of the electrodes. It is desirable to have a high cell constant for high conductivity solutions and a low cell constant for low conductivity solutions, and therefore it is important that the cell constant may be easily varied. It is also convenient to have a probe with a plurality of conductivity cells of different cell constants. This may easily be done by the layout of the desired printed circuitry to be placed on the substrate 11.

During the making of the probe, following the etching of the substrate to define the electrodes thereon, the theremistor 14 is suitably connected at one end to the input end of the electrode 12 and mounted on and at one end of the board. The thermistor 14, responding to the temperature of the solution being tested, compensates for temperature variation of the solution in which the probe is immersed to provide a proper and correct measurement. The leads or conductors 15a and 15b of the electric cord 15 are then connected to the input ends of the electrodes, such as by soldering. Thereafter, the connection points of the leads and electrodes and of the thermistor and the electrode, together with the end of the substrate are encapsulated in a suitable electrical insulating encapsulating material to prevent any possible shorting out across the leads and electrodes that would disable the probe. Thus, the encapsulation material 16 protects the input ends of the electrodes and also connects or fastens the electric cord 15 to the substrate 11. A suitable plug 19 is connected to the electric cord 15 for facilitating connection of the probe into a testing circuit.

Figure 4:
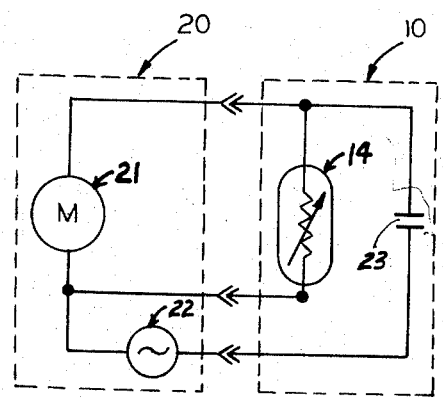
FIG. 4 is an electrical schematic diagram of the probe of FIG. 1 and shown in association with a conductivity tester.

Referring to the electrical schematic diagram of FIG. 4, a probe 10 is shown to be connected to a conductivity tester 20, the latter of which for simplicity purposes is shown to include a meter 21 and a source of alternating potential 22 for driving the probe. The electrodes 12 and 13, constituting a conductivity cell, are shown as a cell 23. It may be noted that the thermistor is connected across the meter 21, wherein one end is carried out through the cord 15, through the plug 19 and to a connection point.

Figure 5:
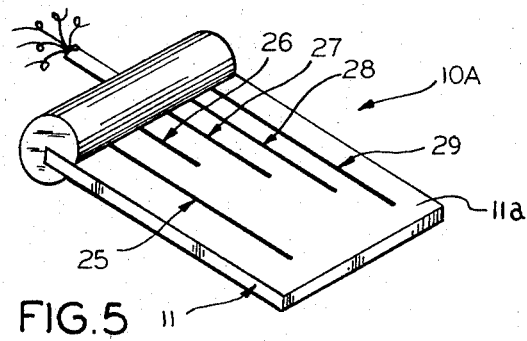
FIG. 5 is a perspective view of a modified probe according to the invention.

A modified probe 10A is shown in FIG. 5 for the purpose of illustrating how a plurality of conductivity cells can be provided on a single probe. Any number of conductivity cells may be built into a single probe, and here illustrated are four cells, each of which use but not necessarily must use a common electrode 25 as one of the electrodes, and electrodes 26, 27, 28 and 29 as the other of the electrodes. For example, the common electrode 25 and the electrode 26 define a conductivity cell having a predetermined cell constant, while the electrode 25 and electrode 27 define a conductivity cell of another cell constant, the electrode 25 and the electrode 28 define a conductivity cell of another cell constant, and the electrode 25 and electrode 29 define a conductivity cell of another cell constant.

Figure 6:
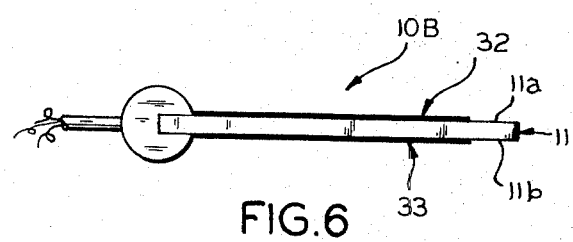
FIG. 6 is a side elevational view of a still further modified probe according to the present invention.

It should be further appreciated that a pair of electrodes defining a conductivity cell need not both be on the same side of the substrate 11. Illustrated in FIG. 6 is a modified probe 10B having one electrode 32 of a conductivity cell on the side 11a of the substrate 11, and the other electrode 33 of the conductivity cell on the side 11b of the substrate.

From the foregoing, it can be appreciated that the probe of the invention may have any number of conductivity cells to permit flexibility in measuring solutions of varying conductivity. Further, the probe may be easily cleaned by wiping of surfaces on which the electrodes are provided with a cloth or similar material. It should also be appreciated that the probe of the invention can stand considerable abuse without breaking, and will be essentially maintenance-free. Further, it can be made inexpensively.

It will be understood that modifications and variations may be effected without departing from the scope of the novel concepts of the present invention, but it is understood that this application is to be limited only by the scope of the appended claims.

We claim:

1. The combination of a portable probe and a flexible conductor line extending therefrom for use with a conductivity measuring instrument wherein the probe is adapted to be manually immersible in a solution for measuring the electrolytic conductivity of the solution, said probe comprising, a rigid substrate of insulative material mounted on the end of a flexible conductor line, a plurality of conductivity cells in the form of printed circuitry defined by a single common electrode and a plurality of spaced electrodes of varying surface areas, said conductor line having a lead connected to said common electrode and leads connected to each of said spaced electrodes, a temperature compensating means mounted on the substrate adjacent the electrodes and connected at one end to said common electrode and adapted to be connected at the other end through a lead in the flexible conductor line to a connection point in the instrument to compensate for variation of solution temperature, and means encapsulating the connections and temperature compensating means with insulating material.

2. The combination of a portable probe and a flexible conductor line extending therefrom for use with a conductivity measuring instrument wherein the probe is adapted to be manually immersible in a solution for measuring the electrolytic conductivity of the solution, said probe comprising, a rigid substrate of insulative material having front and back faces and mounted on the end of a flexible conductor line, a conductivity cell in the form of printed circuitry defined by one electrode on one face and a second electrode on the other face, said conductor line having a lead connected to said one electrode and a lead connected to said second electrode, a temperature compensating means mounted on the substrate adjacent the electrodes and connected at one end to said one electrode and adapted to be connected at the other end through a lead in the flexible conductor line to a connection point in the instrument to compensate for variation of solution temperature, and means encapsulating the connections and temperature compensating means with insulating material.

* * * * *